UNITED STATES PATENT OFFICE.

J. B. OBERNETTER, OF MUNICH, BAVARIA.

MODE OF SECURING PHOTOGRAPHIC PICTURES ON CERAMIC WARE, &c.

Specification forming part of Letters Patent No. 52,503, dated February 6, 1866.

*To all whom it may concern:*

Be it known that I, J. B. OBERNETTER, of Munich, in the Kingdom of Bavaria, have invented a new and Improved Process of Producing Photographic Pictures on Ceramic Articles, including Glass; and I do hereby declare that the following is a full and exact description thereof.

My invention consists, first, in producing photographic pictures on ceramic articles, including glass, by causing a surface coated with a mixture of sugar of milk, glycerine, gum, or some similar substance and a soluble bichromate to be acted upon by light through a translucent picture; secondly, in treating this surface, when it has been exposed to the solar rays, with a mixture of soap and any of the substances usually employed for coloring or burning on china or glass; thirdly, in forming a coherent mass of the film by covering it with collodion; fourthly, in removing this collodionized film, which now contains the image, by the action of water; fifthly, in transferring the image so removed to any article of china or glass and causing it to adhere thereto by any ordinary adhesive substance dissolving the collodion and leaving the color composing the picture; and, lastly, in baking or burning in the said article in the usual manner adopted for china or glass.

The following method of carrying out the above-mentioned general principles has been found to produce a satisfactory result: I coat a smooth surface—glass, for instance—with a solution of gum, sugar of milk, glycerine, and bichromate of ammonium. The plate is then dried in a stove, and when dry is exposed to the action of light passing through a photograph or other translucent object, after the usual practice of photography. To render the desired image visible I now apply, by means of a roller or other suitable apparatus, a dried mixture of soap and any of those substances usually employed for coloring china or glass, to which is added an ordinary flux. On those parts of the film where the sensitive surface has been most acted upon the least quantity of color will be found to adhere, and where it has been the least acted upon the greatest.

To remove the impression from the plate and to transfer it to the ceramic article I pour collodion thereon and subsequently immerse it in water, when the soluble matters are dissolved and the collodion film floods away with the picture thereon, which film may be pasted on any article which it is desired to ornament. After the collodion film is dry I dissolve the collodion itself by ether or other solvent, leaving the image upon the ceramic article, which image may be burned in in the usual manner. The pictures may be afterward treated with any ordinary china or glass colors, as may be thought desirable.

In practice I find the following process to be the best: I coat a glass plate with a solution made as follows: Gum, five grams; sugar, fifteen grams; glycerine, five-tenths of a gram; bichromate of ammonium, six-tenths of a gram; water, one hundred grams, in exactly the same manner as a plate is coated with iodized collodion in ordinary photography. The plate is then dried in a drying-stove, at a temperature of 30° to 50° centigrade, in the dark. A positive picture is now placed on the prepared surface of the plate and exposed to the action of light. The time of exposure depends upon the intensity of the light—from five to thirty minutes. The plate, on which the image is now slightly visible, is next treated with a very intimate mixture of one hundred parts of porcelain color with flux and one part of oleate of soda. This is applied with a brush until the required density is attained in the picture. To remove the image now developed by the porcelain color from the plate I coat it with a film of collodion, and when dry immerse it in water containing two to three per cent. of an alkali. The film now readily leaves the plate, and, after being washed with the prepared surface undermost, must be pasted with a solution of three per cent. gelatine in water on the ceramic article which it is desired to ornament. After being dried spontaneously the collodion film is dissolved from the picture with ether, after which the ceramic article on which the image is placed is burned in an ordinary muffle-furnace.

Pictures produced in this manner may be ornamented or painted with the ordinary ceramic enamel colors.

After having thus described the nature of the said process and the practical working of it, I wish now to state the theoretical principles on which my invention is based. On those parts of the plate prepared with my chromate mixture on which the light has not acted the free chromic acid decomposes the soap which is mixed with the porcelain color in such manner that the fat is liberated, while the alkali of the soap is combined with chromic acid. The fat thus liberated forms, first, a protection for the color and flux against the action of the chromic acid, and, secondly, acts as a medium for uniting the flux, color, and collodion.

I do not claim the use of bichromates, glycerine, collodion, and sugar in the art of photography, when used in any other method or combination than afore described. I do not wish to restrict myself to the use of the materials named, nor do I claim them as new; but What I do claim is—

The herein-described process of producing photographic pictures on ceramic articles, including glass, to be burned in, as set forth.

J. B. OBERNETTER.

Witnesses:
CH. F. CLEMM,
N. LENNIG.